N. A. PETRY.
PEDAL.
APPLICATION FILED OCT. 26, 1917.
1,255,220.
Patented Feb. 5, 1918.
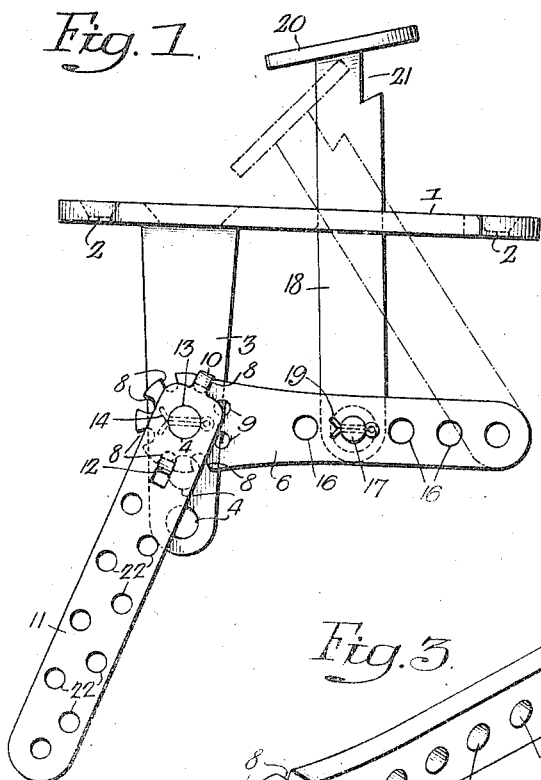
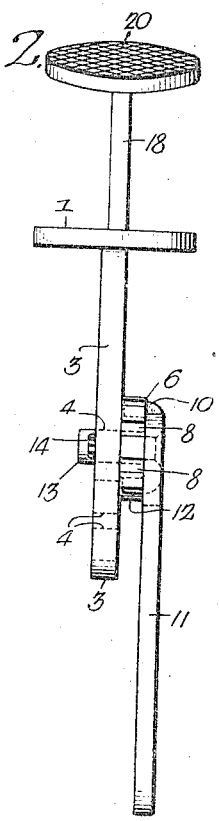
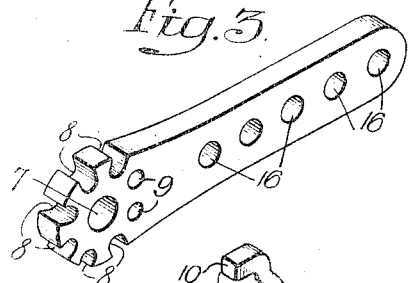
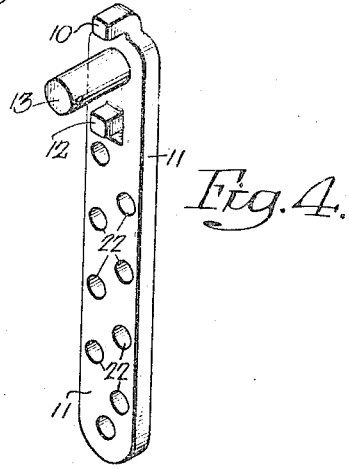
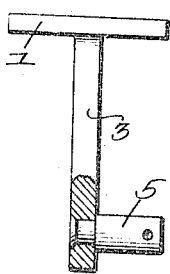
Inventor:—
Nicholas A. Petry.
by his Attorneys.
Howson & Howson

UNITED STATES PATENT OFFICE.

NICHOLAS A. PETRY, OF PHILADELPHIA, PENNSYLVANIA.

PEDAL.

1,255,220.  Specification of Letters Patent.  Patented Feb. 5, 1918.

Application filed October 26, 1917. Serial No. 198,628.

*To all whom it may concern:*

Be it known that I, NICHOLAS A. PETRY, a citizen of the United States, residing in Philadelphia, Pennsylvania, have invented Pedals, of which the following is a specification.

One object of this invention is to provide a novel combination of parts especially designed for use in controlling certain apparatus employed on a motor vehicle, the invention particularly contemplating a construction which in addition to being simple, substantial and inexpensive, shall be capable of wide adjustment to suit it for use under different conditions, such as exist in various makes of vehicles.

These objects and other advantageous ends I secure as hereinafter set forth, reference being had to the accompanying drawings, in which:

Figure 1 is a side elevation of a pedal constructed according to my invention;

Fig. 2 is an end elevation of the pedal shown in Fig. 1;

Figs. 3 and 4 are perspective views of the two lever arms forming part of my invention; and Fig. 5 is an end elevation partly in section, further illustrating my invention.

In the above drawings, 1 represents a plate designed to be set in or upon the floor of a motor vehicle or other structure to which it is desired to apply my device and it is preferably made with holes 2 adjacent its opposite ends for the reception of screws or other members for retaining it in place.

Rigidly connected to and extended downwardly from this plate is an arm or bracket 3 which in one form of my invention is provided with a number of holes 4 at different distances from said plate. In the modification of the invention, shown in Fig. 5, this arm has rigidly fixed in it a laterally extending pivot pin 5 serving as a fulcrum for lever arms hereafter referred to.

The first of these lever arms, indicated at 6, has a transverse pivot hole 7 adjacent one end and the latter, which is substantially semi-circular in outline, is formed with a series of edge notches or recesses 8. In the body of the lever and at the same distance from the pivot hole 7 as said notches there are provided a suitable number of holes 9. These holes and the notches 8 are preferably uniformly spaced around the hole 7 and are designed for the reception of a pair of pins 10 and 12, pressed out of the body of or otherwise rigidly mounted in a second lever arm 11. Said pins are placed on opposite sides of a pivot 13 which is rigidly fixed to said lever arm 11 and is designed to project through the opening 7 of the lever arm 6 as well as through any one of the openings 4 of the plate-carried arm 3, in the latter of which it is freely rotatable. A cotter pin 14 (Fig. 1) serves to retain this pivot with its associated parts in their assembled positions.

Each of the notches 8 is preferably though not necessarily arranged opposite or 180° distant from another notch or one of the holes 9, so that the lever arms 6 and 11 may be assembled parallel with each other as shown in Fig. 1, with the pins 10—12 in any opposite pair of notches or holes 8—9. It is obvious that said arms may be arranged in any of eight relative positions at angles 45° apart, although it is to be understood that any other angular relation of the arms may be obtained by suitably varying the numbers and positions of the notches 8 and holes 9.

The lever arm 6, in addition to the above holes and notches, is provided with a series of holes 16, preferably arranged on its longitudinal axis and designed for the reception of a pin or pivot 17 whereby it may be operatively connected to the foot bar 18. This latter is shown as having the pivot 17 rigidly fixed in it and as held to the arm 6 by a cotter pin 19. Said bar extends through a suitable longitudinally extending slot in the floor-plate 1 and has riveted or otherwise rigidly fixed to its upper end a head 20, immediately under which it has a notch 21 designed to receive the floor plate in order that it may be retained in a depressed position.

With the above described arrangement of parts it is obvious that the bell crank lever provided by the arms 6—11 may be swung in one direction on the pivot pin 13 by a downward pressure exerted on the head 20 of the foot bar 18 and may be retained in a displaced position by swinging said bar forwardly on its pivot pin 17 so as to hook the upper edge of its notch 21 under the adjacent portion of the foot plate.

Obviously the angle at which the arm 11 extends relatively to the arm 6 may be varied at will by moving the cotter pin 14, then disengaging the pins 10—12 and shifting it to the desired position, after which said pins may be entered in the proper notches or holes 8—9 and the cotter pin replaced in the pivot 13.

In order to provide for the adjustable attachment to the arm 11 of a link or other member for transmitting movement, I provide said arm with a series of preferably staggered holes 22. In order to vary the effective length of the lever arm 6, I may shift the position of the pivot pin 7 from one to another of the holes 16 so that when in the extreme one of these latter it may occupy the position shown in dotted lines in Fig. 1.

The amount of projection of the foot rod 18 above the level of the floor plate may be altered to suit various conditions of adjustment by shifting the position of the pivot pin 13 from one to the other of the holes 4 in the fixed arm or bracket 3.

I claim:—

1. The combination in a pedal of a supporting structure; a pair of lever arms of which one has a pair of projecting pins and the other has a circular series of openings for the reception of said pins; a pivot whereby the arms are fulcrumed on the supporting structure; and an operating member connected to one of said arms.

2. The combination in a pedal of a supporting structure; a lever fulcrumed thereto consisting of two relatively adjustable arms of which the end of one has a series of edge indentations and also perforations in its body on a circle including said indentations, the other arm having a pair of laterally projecting pins on opposite sides of its pivot formed to enter said indentations and openings; with an operating member connected to one of the lever arms.

3. The combination in a pedal of a floor plate; an arm rigidly connected to and extending downwardly from the same; a lever having two arms; a pivot pin operatively connecting said arms to the rigid arm of the plate; an operating member connected to one of the lever arms; with means for adjustably connecting the lever arms consisting of a series of edge indentations and body openings arranged in one of said arms concentric with the pivot, and a pair of pins projecting laterally from the other lever arm on opposite sides of the pivot in positions to enter said indentations and openings.

4. The combination in a pedal of a floor plate; a rigidly connected arm extending downwardly from said plate and having a plurality of pivot holes; two relatively adjustable lever arms including means for rigidly holding them in any adjusted angular positions; a pivot pin connecting said lever arms to said rigid arm and rotatable in one of the openings thereof; with a headed operating bar connected to one of the lever arms and guided by the plate.

5. The combination in a pedal of a floor plate having a rigidly connected downwardly projecting arm; a lever fulcrumed to said arm and having a series of openings formed in one of its arms at different distances from its fulcrum; an operating bar slidably guided by the plate; and a pivot pin adjustable to any of the openings in the lever arm for connecting said operating bar thereto.

In witness whereof I affix my signature.

NICHOLAS A. PETRY.

Copies of this patent may be obtained for five cents each, by addressing the "Commissioner of Patents, Washington, D. C."